United States Patent
Nishimura et al.

(10) Patent No.: US 7,578,621 B2
(45) Date of Patent: Aug. 25, 2009

(54) FLUID DYNAMIC-PRESSURE BEARING DEVICE AND SPINDLE MOTOR

(75) Inventors: Hideki Nishimura, Kyoto (JP); Yoshito Oku, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/926,345

(22) Filed: Oct. 29, 2007

(65) Prior Publication Data
US 2008/0056104 A1    Mar. 6, 2008

Related U.S. Application Data

(63) Continuation of application No. 11/162,367, filed on Sep. 8, 2005, now Pat. No. 7,290,934.

(30) Foreign Application Priority Data
Sep. 9, 2004    (JP)    ............... 2004-261975

(51) Int. Cl.
*F16C 32/06*    (2006.01)
(52) U.S. Cl. ................. 384/107; 384/112
(58) Field of Classification Search ........... 384/100, 384/107, 112, 121, 123; 360/99.08, 98.07
See application file for complete search history.

(56) References Cited

U.S. PATENT DOCUMENTS

| | | | |
|---|---|---|---|
| 4,254,961 A | 3/1981 | Fersht et al. | |
| 5,533,811 A | 7/1996 | Polch et al. | |
| 5,558,443 A | 9/1996 | Zang et al. | |
| 5,659,445 A | 8/1997 | Yoshida et al. | |
| 5,723,927 A | 3/1998 | Teshima | |
| 6,456,458 B1 | 9/2002 | Ichiyama | |
| 6,836,388 B2 | 12/2004 | Nishimura et al. | |
| 6,914,358 B2 | 7/2005 | Tokunaga et al. | |
| 6,939,047 B2 | 9/2005 | Gomyo et al. | |
| 7,021,829 B2 | 4/2006 | Tamaoka | |
| 7,201,517 B2 | 4/2007 | Gomyo et al. | |
| 7,290,934 B2 * | 11/2007 | Nishimura et al. | .......... 384/107 |
| 2003/0091250 A1 | 5/2003 | Gomyo | |
| 2003/0231813 A1 | 12/2003 | Gomyo et al. | |

(Continued)

FOREIGN PATENT DOCUMENTS

JP    1-31778    9/1989

(Continued)

*Primary Examiner*—Thomas R Hannon
(74) *Attorney, Agent, or Firm*—Volentine & Whitt, PLLC

(57) ABSTRACT

A fluid dynamic-pressure bearing includes a rotatable shaft, a hub, a fixed portion, and a lubricating liquid. The hub includes a hub thrust bearing surface extending from the shaft outwardly in a radial direction and an annular surface. The fixed portion includes a fixed-portion upper thrust bearing surface facing the hub thrust surface and a flange surface facing the annular surface. The hub thrust bearing surface, the fixed-portion upper thrust bearing surface, and the lubricating liquid arranged therebetween form together an upper thrust dynamic-pressure bearing. The annular surface and the flange surface define an annular gap therebetween. An axial dimension of the annular gap is larger than a total of an axial dimension of an upper thrust gap between the hub thrust bearing surface and the fixed-portion upper thrust bearing surface and an average depth of upper thrust dynamic-pressure generating grooves of the upper thrust dynamic-pressure bearing.

20 Claims, 13 Drawing Sheets

U.S. PATENT DOCUMENTS

| | | |
|---|---|---|
| 2004/0091187 A1 | 5/2004 | Aiello et al. |
| 2004/0212921 A1 | 10/2004 | Herndon et al. |
| 2005/0069232 A1* | 3/2005 | Aiello et al. ................ 384/100 |
| 2005/0219742 A1 | 10/2005 | Herndon et al. |

FOREIGN PATENT DOCUMENTS

| | | |
|---|---|---|
| JP | 131778 | 9/1989 |
| JP | 2001-065552 A | 3/2001 |
| JP | 3182014 | 4/2001 |
| JP | 2001099141 | 4/2001 |
| JP | 2003-148457 A | 5/2003 |
| JP | 3465204 | 8/2003 |
| JP | 2003262217 | 9/2003 |
| JP | 2003329033 | 11/2003 |
| JP | 2005-048890 | 2/2005 |
| JP | 3752263 | 12/2005 |

* cited by examiner

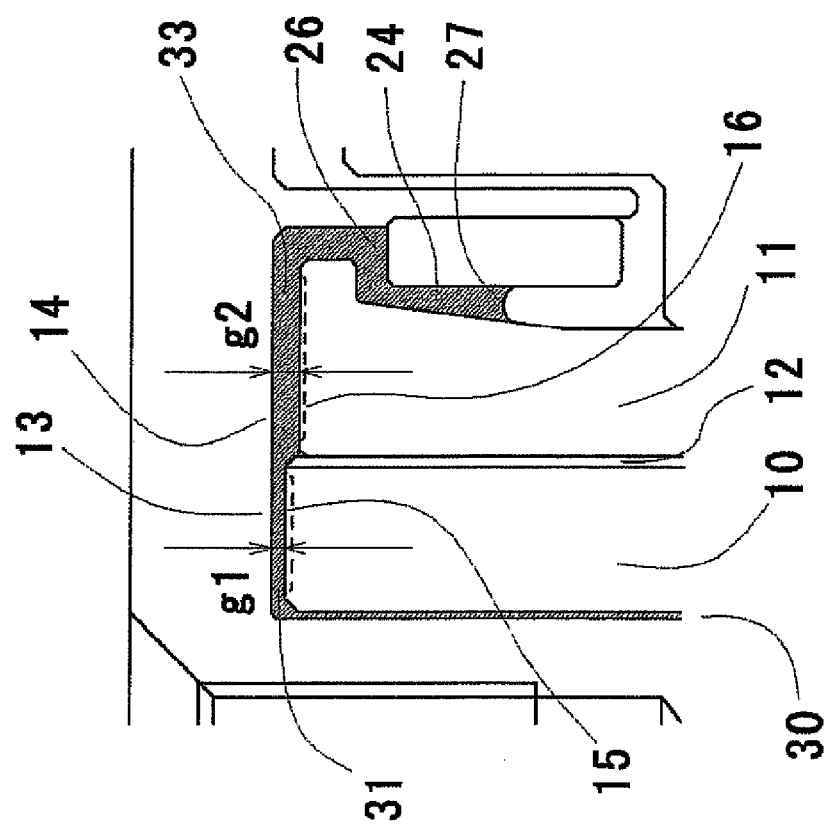
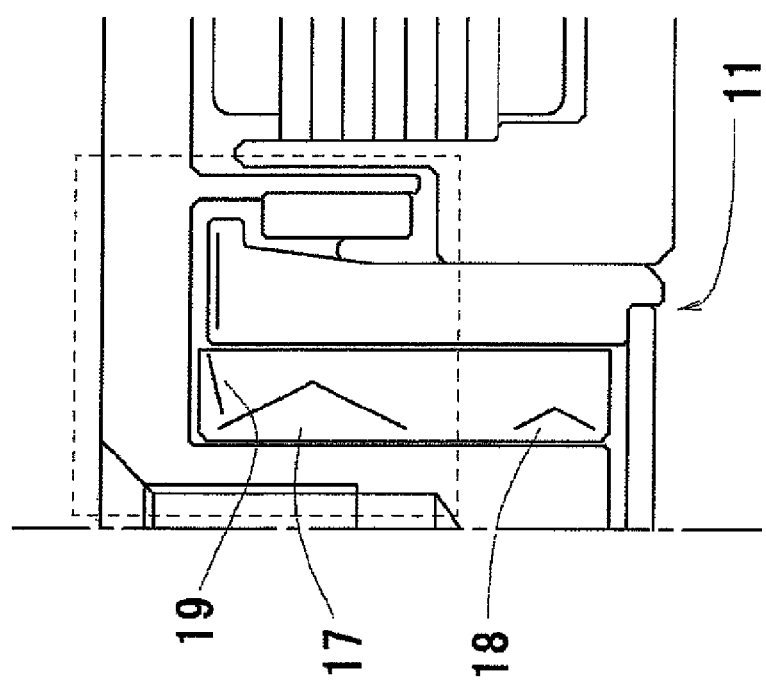
FIG. 4B
FIG. 4A

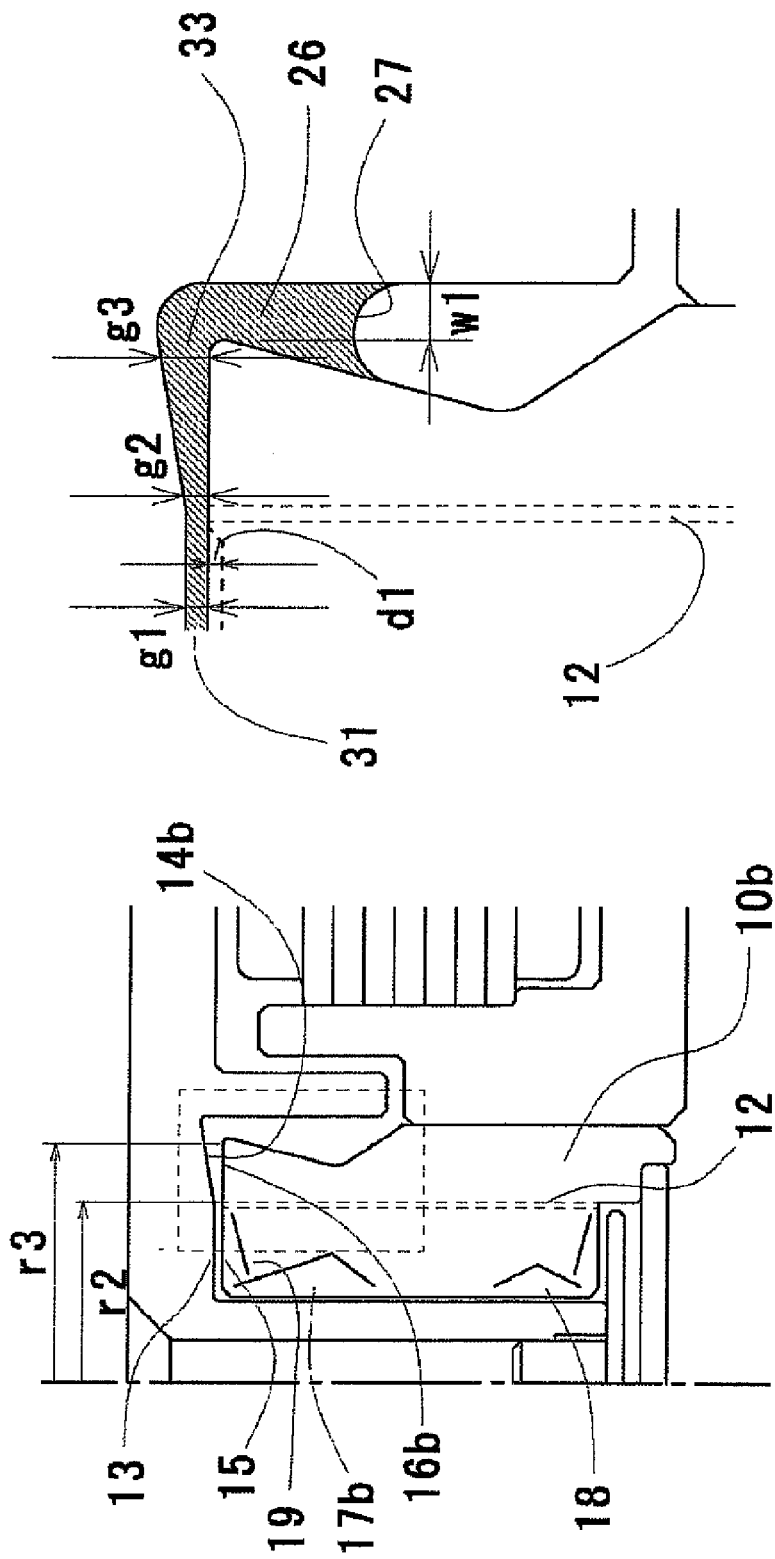

FLUID DYNAMIC-PRESSURE BEARING DEVICE AND SPINDLE MOTOR

CROSS-REFERENCE TO RELATED APPLICATIONS

This is a continuation of U.S. non-provisional application Ser. No. 11/162,367, filed Sep. 8, 2005, and issued on Nov. 6, 2007, as U.S. Pat. No. 7,290,934, which is incorporated herein by reference in its entirety.

BACKGROUND OF THE INVENTION

1. Field of the Invention

The present invention relates to fluid dynamic-pressure bearing devices for use in hard disk driving devices and hard disk devices incorporating the fluid dynamic-pressure bearing device for rotatably supporting the disk mounting portion.

2. Description of the Related Art

In recent years, miniaturization of personal computers and mounting of hard disks into compact-size portable apparatuses have been advanced. Furthermore, miniaturization of hard disks has been also advanced from a conventional size of 3.5 inch size to more miniaturized sizes such as 2.5 inch and 1.0 inch or less. In view of such trends, there has been a need for miniaturization of fluid dynamic-pressure bearing devices for supporting the hub of a hard disk.

FIG. 11 illustrates a fluid dynamic-pressure bearing which places the hub lower surface on the upper surface of a sleeve such that they face each other with a narrow gap sandwiched therebetween to form a thrust dynamic-pressure bearing and places a tapered sealing portion on the sleeve side surface. With this configuration, the use of a thrust plate can be omitted to reduce the height of the bearing device.

FIG. 12 illustrates a dynamic-pressure bearing device including herringbone shaped thrust dynamic-pressure generating grooves and grooves provided outside thereof for feeding lubricating liquid towards the bearing center. This configuration can prevent the leakage of the lubricating liquid even during high-speed rotation of the bearing.

Although these bearing devices exhibit preferable characteristics, they also suffer certain drawbacks during operation.

With the dynamic-pressure bearing device of FIG. 11, the lubricating liquid can not be circulated between the shaft tip end and the thrust bearing portion, which may induce a significant pressure difference between the shaft tip end portion and the thrust bearing side. With the dynamic-pressure bearing device of FIG. 12, redundant rows of grooves are provided for feeding oil on the thrust dynamic-pressure bearing surface, which prevents sufficient reduction of the resistance during the rotation of the bearing.

FIG. 13 illustrates a dynamic-pressure bearing device which includes a thrust dynamic-pressure bearing portion formed on a sleeve end surface. This device of this example is prone to interruptions of the lubricating liquid outside of the thrust dynamic-pressure bearing portion. In addition, this device is prone to accidental discharge of oil to the outside due to the influence of the rotating hub, which has made it impossible to ensure high reliability.

It is an object of the present invention to realize reliable and small-size fluid dynamic-pressure bearing devices which include a bearing with a small height, induce small shaft losses and are less prone to troubles such as shortage and leakage of lubricating liquid.

SUMMARY OF THE INVENTION

According to the present invention, the interface of lubricating liquid is placed on the side surface of the bearing and the bearing gap and the interface are communicated with each other through an annular gap. With this configuration, the annular gap portion also serves as an oil buffer, thus easily maintaining the amount of oil. Further, this configuration is widened in the radial direction of the bearing, thus enabling reduction of the height of the bearing device.

In a conventional fluid dynamic-dynamic bearing device, the thrust dynamic-pressure bearing has been formed at such an annular gap portion, and thus it has been positioned radially outside of the bearing, thus causing an increase of the shaft loss. Particularly, in the case of a compact-size bearing, such losses in the thrust dynamic-pressure bearing are relatively large. It is easy to form thrust dynamic-pressure grooves at more inward position in the radial direction in order to overcome the problem. However, even in such a case, an annular gap is left, thus preventing sufficient reduction in shaft loss.

According to the present invention, in order to reduce the resistance at the annular gap portion, the dimension of the annular gap is made greater than the gap of the thrust dynamic-pressure bearing portion (hereinafter, referred to as a thrust narrow gap). The difference in the gap dimension is set to be equal to or greater than the average depth of the thrust dynamic-pressure generating grooves. This enables reduction of the resistance, thus reducing the bearing loss.

In the present invention, grooves having a spiral shape or the like may be formed at the annular gap portion to stir up lubricating liquid in the inward direction of the bearing. This causes inward flows of the lubricating liquid along the stirring-up grooves. When air bubbles are contained in the lubricating liquid, the air bubbles are pushed out to the outside of the annular gap as a reaction of the inward lubricating liquid. Thus, air bubbles in the lubricating liquid are effectively discharged. If air bubbles are accumulated within the annular gap portion, this may cause troubles such as leakage of the lubricating liquid since the lubricating oil is pushed out due to the thermal expansion of air bubbles. With the present invention, such air bubbles can be discharged, thus increasing the reliability of the bearing.

In to the present invention, a communicating path may be provided in the fixed member to communicate the outer periphery of the thrust narrow gap with the end portion of the radial narrow gap. Since the lubricating liquid flows through the communicating path, it is possible to prevent the occurrence of excessive pressure increases and decreases at the tip end portion of the radial narrow gap. Further, this also facilitates discharge of air bubbles generated within the radial bearing.

In the present invention, grooves may be formed on the sleeve outer periphery or the housing inner periphery and, under this condition, the sleeve may be inserted within the housing inner periphery to form the fixed portion. By inserting the sleeve, the open sides of the grooves are closed to form communicating paths extending along the interface between the sleeve and the housing. In comparison with the process for forming a narrow hole, communicating paths can be easily formed. Further, the shape of the communicating paths is not limited to a straight line and may be a spiral shape and the like.

In the present invention, an annular pull-out preventing member may be mounted on the hub and the annular pull-out preventing member may be placed to engage with a sleeve expanded portion at the axially opposite side thereof to form a pull-out preventing portion. This enables formation of a pull-out preventing portion at the side portion of the bearing, thus reducing the height of the bearing device.

In the present invention, the gap between the inner peripheral surface of the pull-out preventing member and the outer peripheral surface of the sleeve may have a tapered shape which is gradually widened to retain the lubricating liquid. This enables checking the position of the lubricating liquid from below the pull-out preventing member, thus enabling increasing the efficiency of operations for checking the state of the injected lubricating liquid, particularly in the case of mass production.

In the present invention, the dimension of the annular gap may be gradually increased towards the outer periphery thereof. Also, such a portion may be partially formed. This configuration facilitates discharge of air bubbles in the lubricating liquid towards the outer periphery of the annular gap, namely towards the sealing portion.

The annular gap is a gap sandwiched between the flange surface and the annular surface and, during the rotation of the bearing, the annular surface and the flange surface are rotated relative to each other. Consequently, radial shear flows are generated in the lubricating liquid retained within the annular gap. Air bubbles in shear flows are deformed since they are affected by the flows. This will cause increases of the surface areas of air bubbles. When the shear flows are weak, respective air bubbles have an almost spherical shape and have a small surface area. Since the increase or decrease of the surface area of each air bubble indicates the increase or decrease of the surface energy, air bubbles tend to be concentrated at portions at which shear flows are weak and their surface energies can be reduced, within a liquid in which there are differences of the shear flow strength.

Since the peripheral velocity of rotation is increased with decreasing distance to the periphery, when the dimension of the annular gap is constant air bubbles tend to be concentrated at inner portions of the gap. By gradually increase the dimension of the annular gap towards the outer periphery thereof, this tendency can be at least partially cancelled. More specifically, the dimension g of the gap can be varied in the radial direction such that the ratio r/g between the distance r from the rotation center and the dimension g of the gap at the position is gradually decreased in the outward direction.

This configuration for varying the dimension of the gap is more effective when it is combined with stirring-up grooves provided at the annular gap portion as previously described.

With the present invention, the dimension of the sealing gap positioned near the lubricating-liquid interface can be made greater than the dimension of the annular gap positioned inside of the bearing device. In this case, shear flows as aforementioned are reduced near the sealing gap, namely near the air/liquid interface of the lubricating liquid. Since air bubbles in the lubricating liquid are subjected to forces which discharge them towards the interface, they are effectively discharged from the fluid dynamic-pressure bearing device.

In the present invention, the thrust bearing surface of the hub and the annular surface outside thereof may be positioned on different planes. As an example of this configuration, an annular step portion may be provided on the bottom surface of the hub so that the portion inside of the step portion forms the thrust bearing surface while the portion outside thereof forms the annular surface. Also, the annular surface may be inclined with respect to the thrust bearing surface. This invention enables increasing the flexibility of the design of the hub shape, thus enabling the realization of more miniaturized spindle motors.

In the present invention, the thrust dynamic-pressure bearing may be configured to increase the pressure of the lubricating liquid inwardly in the radial direction. Since the pressure of the lubricating liquid is higher at the center of the bearing while it is lower at the outer portion within the thrust dynamic-pressure bearing, there is provided the effect of discharging air bubbles in the lubricating liquid to the outside of the thrust dynamic-pressure bearing. Thus, air bubbles can be effectively discharged from the bearing device.

In to the present invention, the thrust dynamic-pressure bearing portion may have a concentric double configuration. This enables generation of a larger supporting force.

According to the present invention, there are provided, for supporting the radial load, a pair of radial dynamic-pressure bearings configured such that the pressure of the lubricating liquid is increased with increasing distance from the shaft ends. This configuration can raise the pressure of the lubricating liquid to above the atmospheric pressure at the bearing gap between the two radial dynamic-pressure bearings, thus preventing the occurrence of air bubbles due to negative pressures. Further, when the two radial dynamic-pressure bearings have different degrees of lubricating-pressure-raising effect, it is possible to circulate the lubricating liquid in a single direction.

In addition to this configuration, it is possible to combine a configuration for increasing the pressure of the lubricating liquid inwardly in the radial direction of the thrust dynamic-pressure bearing. In this case, it is preferable to configure the thrust dynamic-pressure bearing such that it can cancel the lubricating liquid flows caused by the radial dynamic-pressure bearing.

In the present invention, the sleeve may be formed from a porous material. This enables an increase in the amount of oil retained in the bearing device. By inserting an inner mold into the inside of the sleeve and thereafter pressing it from outside, dynamic-pressure generating grooves may be formed on the sleeve inner peripheral surface.

By applying the dynamic-pressure bearing device according to the present invention to a spindle motor, it is possible to realize a reliable spindle motor which requires a low electric current. Also by applying this spindle motor to a hard disk drive, it is possible to provide a reliable hard disk drive.

Further, the bearing and the spindle motor according to the present invention are applicable to polygon scanners and also applications for rotating and driving a removable medium such as a DVD, as well as hard disk drives.

DESCRIPTION OF THE DRAWINGS

FIGS. 4A and 4B are enlarged views of a fluid dynamic-pressure bearing device according to an embodiment of the present invention.

FIGS. 8A and 8B illustrate a modified embodiment of the embodiment of FIG. 7.

DETAILED DESCRIPTION OF THE INVENTION

Hereinafter, there will be described embodiments of a fluid dynamic-pressure bearing device according to the present invention and embodiments of spindle motors and a hard disk drive which incorporate such a fluid dynamic-pressure bearing device.

FIRST EMBODIMENT

Figure 1:
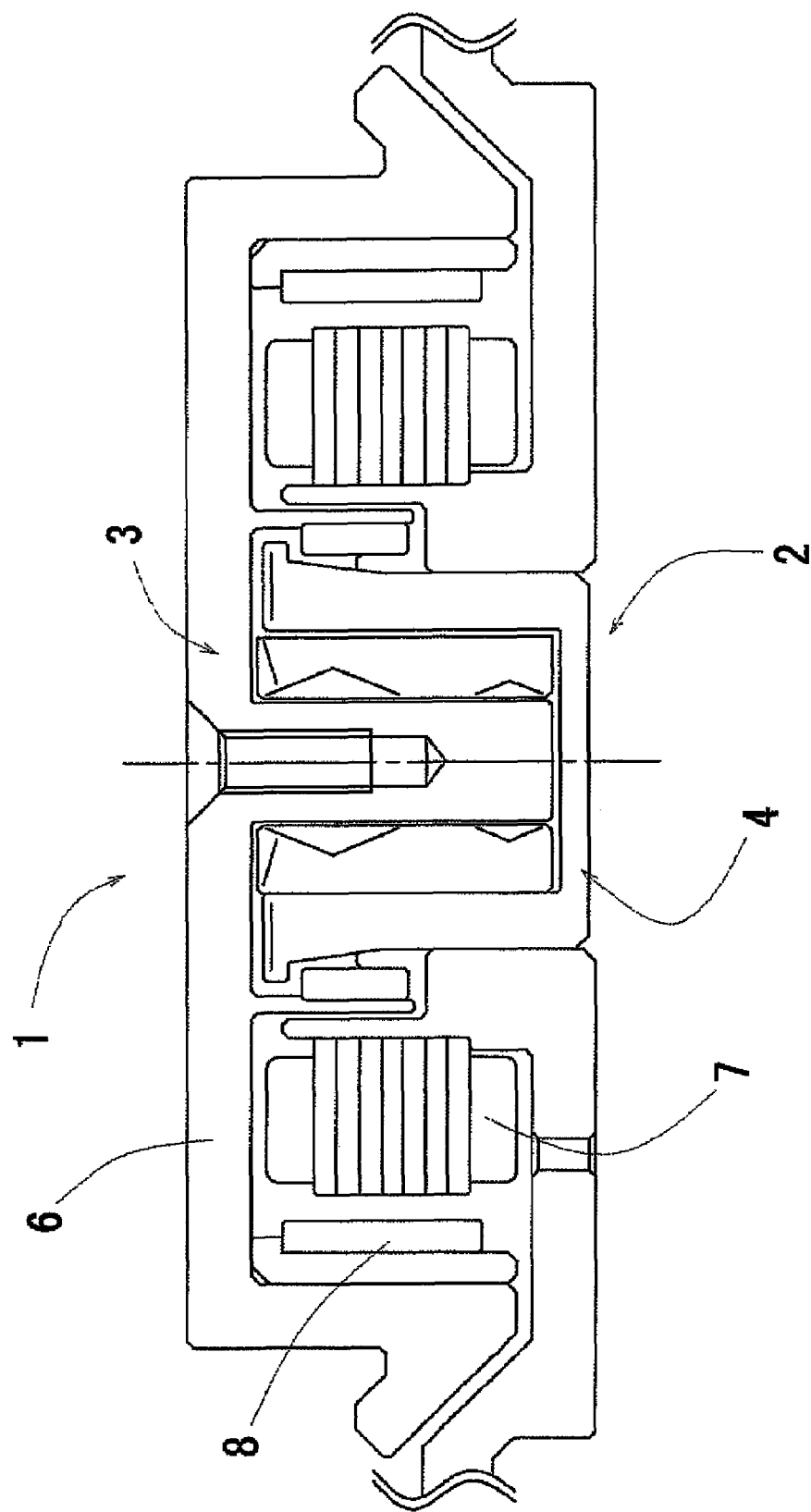
FIG. 1 is a cross-sectional view of a spindle motor according to an embodiment of the present invention.

FIG. 1 is a cross-sectional view of a spindle motor 1 according to the present embodiment. The spindle motor 1 incorporates a fluid dynamic-pressure bearing device 2 according to the present embodiment and a rotor 6 is supported by the fluid dynamic-pressure bearing device 2 such that it is rotatable with respect to a fixed portion 4.

The fixed portion 4 is constituted by a base plate and a stator 7 secured thereon and the fluid dynamic-pressure bearing device 2 is also installed on the fixed portion at the center portion thereof. The outer periphery of the stator faces a rotor magnet 8 mounted on the rotor 6 in the radial direction and, when the stator is energized with a proper phase, the rotor magnet 8 is subjected to a rotational driving force centered on the bearing device, thus causing the rotor to rotate.

Figure 2A:
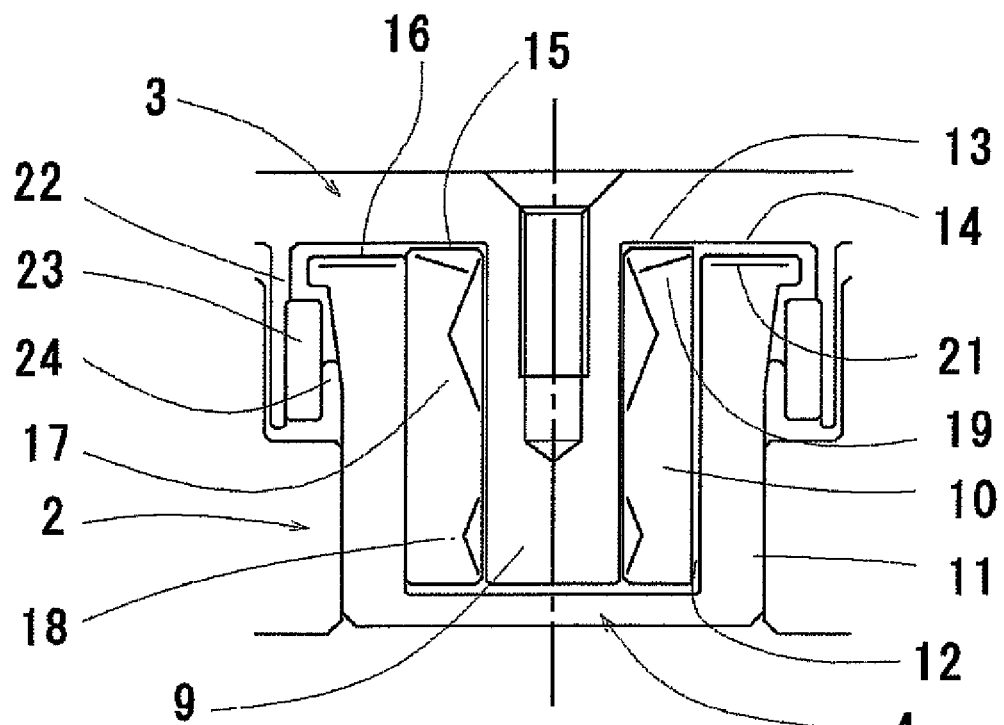
FIGS. 2A and 2B are views of a fluid dynamic-pressure bearing device according to an embodiment of the present invention.
Figure 2B:
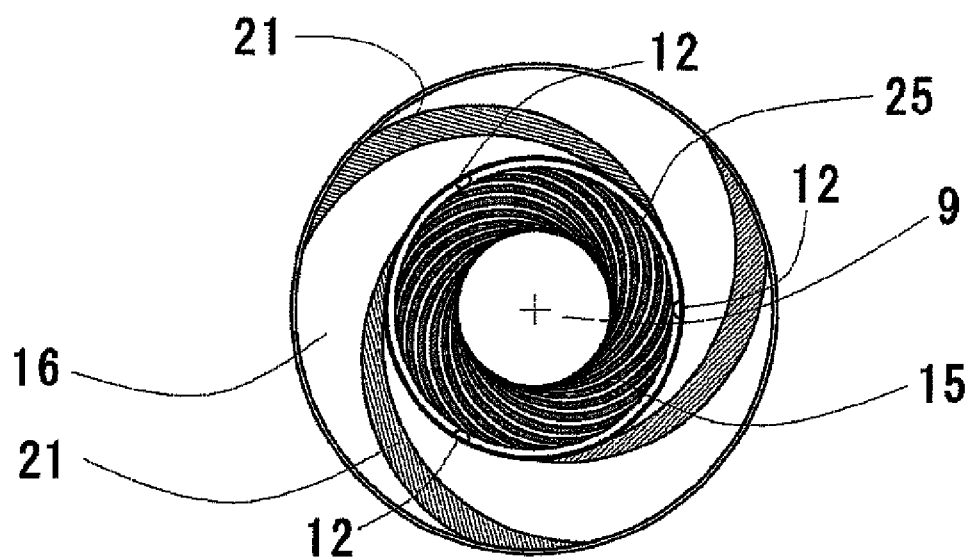

FIG. 2 are views illustrating detail portions of the fluid dynamic-pressure bearing device 2 and FIG. 2A is a cross-sectional view and FIG. 2B is a plan view from above wherein a hub 3 and a shaft 9 are removed. The fixed portion 4 is constituted by a housing 11 and a sleeve 10 inserted within the inner periphery of the housing. The shaft 9 is rotatably inserted into the sleeve 10.

In FIG. 2A, radial dynamic-pressure bearings 17 and 18 are configured along the longitudinal direction of the shaft 9 and support the radial load. The upper end surface of the sleeve 10 forms a thrust bearing surface 15 of the fixed portion. The lower surface of the hub 3 forms a thrust bearing surface 13 of the hub and constitutes a thrust dynamic-pressure bearing 19 in cooperation with the rust bearing surface 15 of the fixed portion. There is an annular surface 14 radially outside of the thrust bearing surface 13 of the hub. The upper end of the housing forms a flat flange surface 16 which is extended outwardly in the radial direction and faces the annular surface 14 in the axial direction. The space between the annular surface and the flange surface is communicated to a sealing gap 24 at the outer periphery thereof. The sealing gap 24 is a space which is formed between the outer peripheral surface of the housing 11 and the inner peripheral surface of a pull-out preventing member 23 and is gradually widened to the lower portion thereof. The interface of lubricating liquid is formed within the sealing gap portion and thus the lubricating liquid fills the inside thereof substantially without causing interruptions.

The lower end portion of the radial dynamic-pressure bearing 18 and the thrust dynamic-pressure bearing 19 are communicated with each other through a communicating path 12 formed around the outer peripheral surface of the sleeve 10. In the event of the occurrence of air bubbles near the lower end portion of the radial dynamic-pressure bearing, the air bubbles are discharged through the communicating path 12. In the event of the occurrence of a significant lubricating-liquid pressure difference between the radial bearing lower end portion and the thrust dynamic-pressure bearing side, the lubricating liquid is communicated therebetween through the communicating path 12 to average the pressure.

In FIG. 2B, there is illustrated a groove pattern. Thrust dynamic-pressure generating grooves 25 are formed on the thrust bearing surface 15 of the fixed portion and have a spiral shape. Stirring-up grooves 21 are formed on the flange surface 16. The stirring-up grooves 21 are also spirally shaped and, during the rotation of the shaft, they stir up oil towards the center of the bearing, while air bubbles within the oil tend to be discharged outwardly in the radial direction of the bearing.

In FIG. 1 and FIG. 2A, the radial dynamic-pressure bearings 17, 18 and the thrust dynamic-pressure bearing are represented by lines inclined with respect to the bearing surfaces. The inclinations of these lines represent the general outline of the pressure change in the lubricating liquid along the dynamic-pressure bearings.

The lines representing the thrust dynamic-pressure bearing 19 are inclined such that they are separated from the bearing surface at the center of the bearing. This indicates that the pressure of the lubricating liquid is gradually increased from the outer periphery of the thrust dynamic-pressure bearing towards the center thereof. The thrust dynamic-pressure generating grooves 25 are spirally shaped and are identical to those in the view of FIG. 2A.

The lines representing the radial dynamic-pressure bearings 17 and 18 are close to the bearing surface at the both sides and are far from the bearing surface at their centers. This indicates that the pressure is lower at the both ends of the dynamic-pressure bearings and is gradually increased towards their centers. In the case where the radial dynamic-pressure bearings are provided with dynamic-pressure generating grooves having a herringbone shape, the pressure of lubricating liquid is changed substantially similarly thereto. Further, in FIG. 2, the stirring-up grooves 21 are drawn to be substantially parallel with the flange surface 16 on which these grooves are formed. This represents that there are large gaps between the stirring-up grooves and thus the grooves generate small pressure differences.

Figure 3:
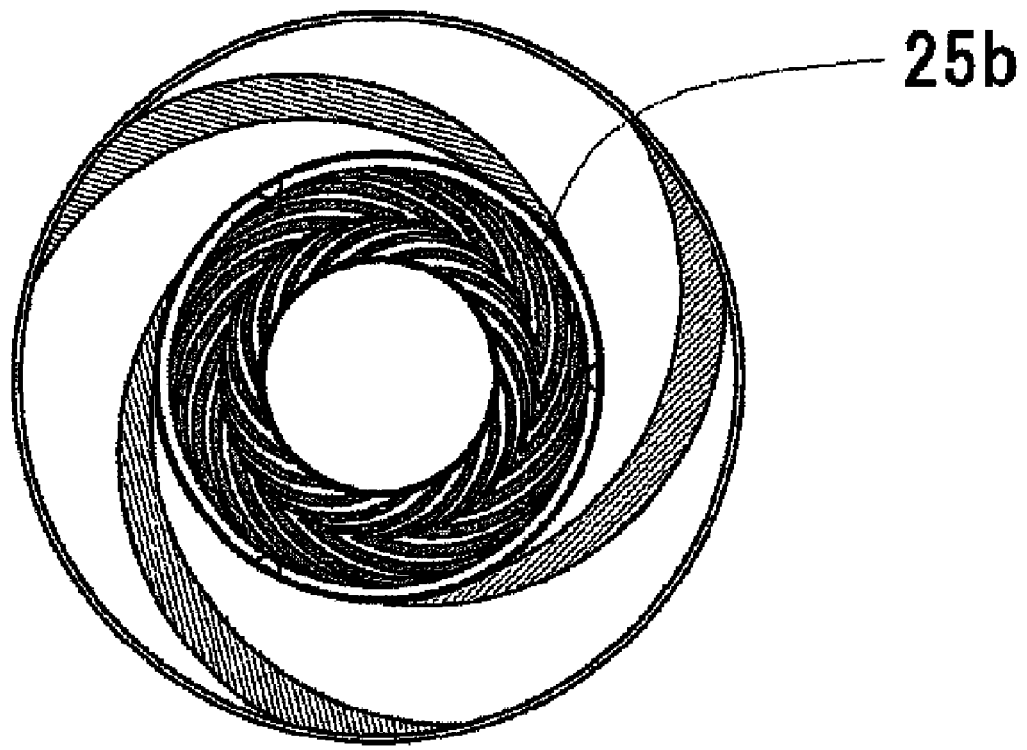
FIG. 3 illustrates another embodiment of thrust dynamic-pressure generating grooves.

FIG. 3 illustrates another example of thrust dynamic-pressure generating grooves. The thrust dynamic-pressure generating grooves 25b are constituted by inward spiral grooves and outward spiral grooves which are placed inside of the inward spiral grooves. In this case, a greatest dynamic pressure is generated between the two types of spirals, thus generating a larger supporting force. Further, the entire thrust dynamic-pressure generating grooves 25b act to inwardly increase the pressure since the outer spirals generate a greater pressure.

FIG. 4A is an enlarged view of the right half portion of FIG. 2A, and FIG. 4B is an enlarged view of the portion encircled by the dotted line in FIG. 4A.

In FIG. 4B, a radial narrow gap 30, a thrust narrow gap 31 and an annular gap 33 are communicated with one another in the mentioned order and are filled with a lubricating liquid 26. The outer peripheral portion of the annular gap 33 is communicated with the sealing gap 24 and the sealing gap is partway filled with the lubricating liquid to form a lubricating-liquid/air interface 27.

The dimension 92 of the annular gap 33 is greater than the dimension g1 of the thrust narrow gap 31.

Figures 5A, 5B:
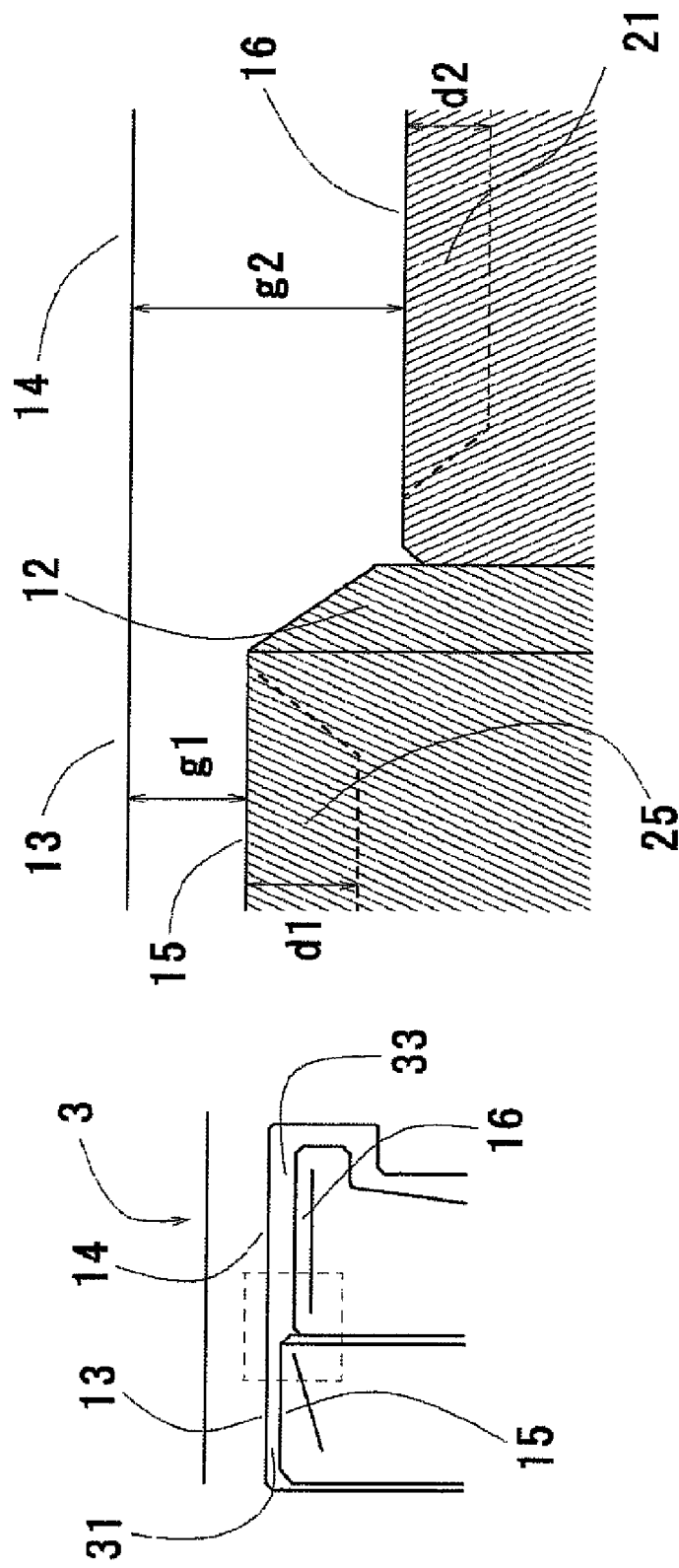
FIGS. 5A and 5B are views for explaining the dimensions of gaps.

FIG. 5 is views illustrating, in more detail, the difference between the dimensions g1 and g2, wherein FIG. 5B illustrates the portion encircled by the dot line in FIG. 5A in an enlarged manner.

The dimension g1 of the thrust narrow gap is the distance between the top portions of the thrust dynamic-pressure generating grooves 25 and the thrust bearing surface 13 of the hub. Similarly, the dimension g2 of the annular gap is the distance between the top portions of the stirring-up grooves and the annular surface 14. In the fluid dynamic-pressure bearing device according to the present invention, the annular gap 33 is provided for facilitating the circulation of the lubricating liquid through the communicating path 12, not for supporting the bearing. Therefore, there is no need for generating a dynamic pressure at this portion. By designing the device such that g2 is greater than g1 plus the depth d1 of the thrust dynamic-pressure generating grooves 25, the aforementioned object can be substantially attained. Further, by setting the dimension d2 to be less than twice the dimension d1, the object can be attained more certainly.

Namely, this condition regarding g1, d1 and g2 means that the flange surface 16 should be lower than the bottoms of the thrust dynamic-pressure generating grooves 25. However, in general, the thrust bearing surface 13 of the hub and the annular surface 14 are made to be at different heights by providing a step therebetween. A general condition which can be applicable to such a case is g2>g1+d1. When the bearing is not rotating and the thrust bearing surface of the hub is contacting to the sleeve, the condition is expressed as g2>d1. In the case of FIG. 5, the dimensions are as follows; d1=7 micrometers, g1=11 micrometers, g2=23 micrometers, and d2=7 micrometers.

SECOND EMBODIMENT

Figures 6A, 6B:
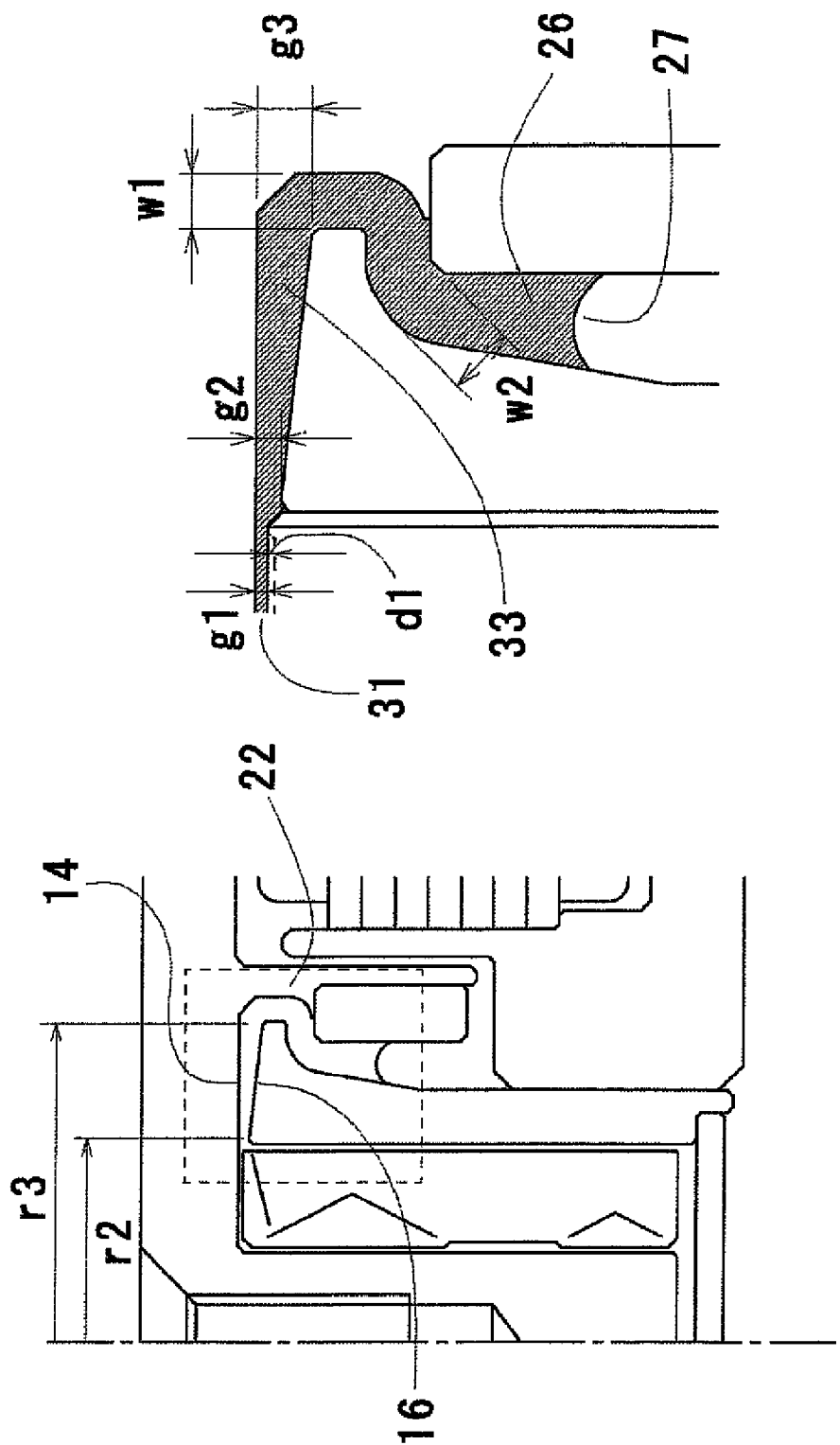
FIGS. 6A and 6B illustrate a modified embodiment 1 of the fluid dynamic-pressure bearing device according to the embodiment of the present invention.

FIG. 6A illustrates a modified embodiment which is provided by making a partial modification to the fluid dynamic-pressure bearing device according to the first embodiment. FIG. 6B illustrates an enlarged view of the portion encircled by the dotted line in FIG. 6A.

In the fluid dynamic-pressure bearing device, the flange surface 16 is inclined outwardly in the radial direction of the bearing. Thus, the dimension of the annular gap is g2 near the inner periphery of the flange surface 16, while it is g3 which is greater than g2 near the outer periphery thereof. Further, the distance w1 between the outer periphery of the flange surface and the inner peripheral surface of the cylindrical wall 22 is equal to or greater than g3, and the width w2 of the sealing gap 27 at the base portion thereof is set to be equal to or greater than w1.

With this configuration, radial shear flows within the lubricating liquid are gradually decreased with increasing distance from the center. Thus, air bubbles in the lubricating liquid are easily discharged towards the sealing gap and to the outside of the bearing.

More specifically, the spacing of the respective portions are as follows; g1=11 micrometers, g2=15 micrometers, g3=29 micrometers, w1=0.11 millimeter, W2=0.13 millimeter. The radius r2 of the flange surface inner periphery is 2.4 millimeters, and the radius r3 of the flange surface outer periphery is 3.7 millimeters. The value of r2/g2 is greater than the value of r3/g3, which exerts a force to outwardly discharge air bubbles in the lubricating liquid. Furthermore, the relation g3<w1<w2 holds, which suppresses the back-flow of air bubbles discharged from the annular gap. With conventional designs, w1 is much greater than g3 and the velocities of shear flows are significantly reduced outside of w1. Therefore, the effect of shear-flow velocity differences for discharging air bubbles is small between this position and the lubricating-liquid interface 27 and air bubbles are discharged due to the gap differences.

Further, in this case, even if there is locally a portion which does not satisfy the relation g2>g1+d1 near the inner periphery of the flange surface, the effects of the present invention can be provided. Although such a portion which does not satisfy the relation g2>g1+d1 increases the loss of the bearing, it affects to only a portion of the entire flange surface. The relation g2>g1+d1 holds outside of the portion, which suppresses the increase of the loss of the bearing. Further, it also serves as an oil buffer.

THIRD EMBODIMENT

Figure 7A:
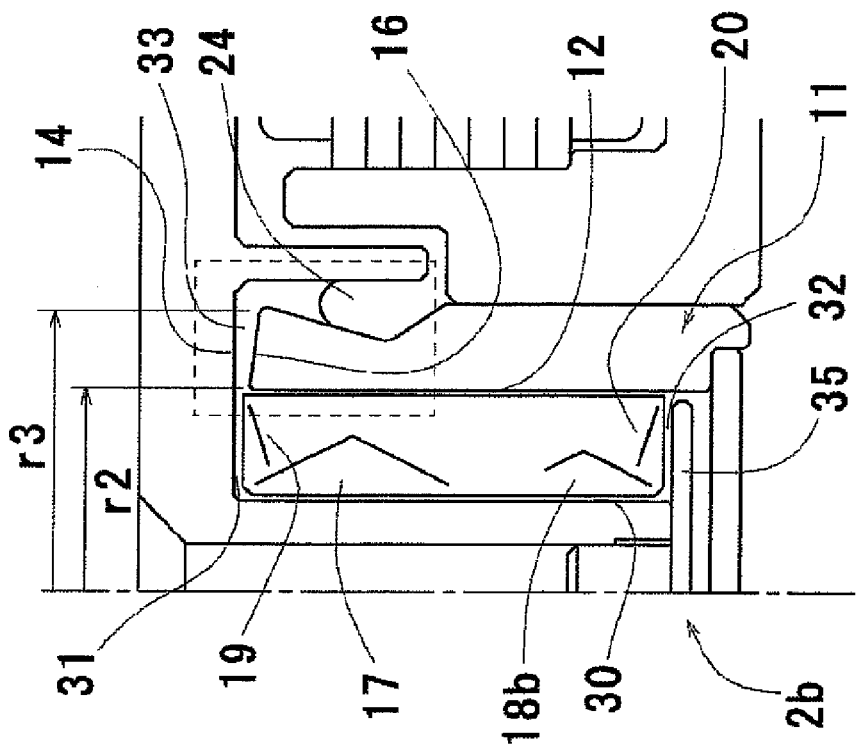
FIGS. 7A and 7B illustrate another embodiment 1 of the fluid dynamic-pressure bearing device according to the embodiment of the present invention.
Figure 7B:
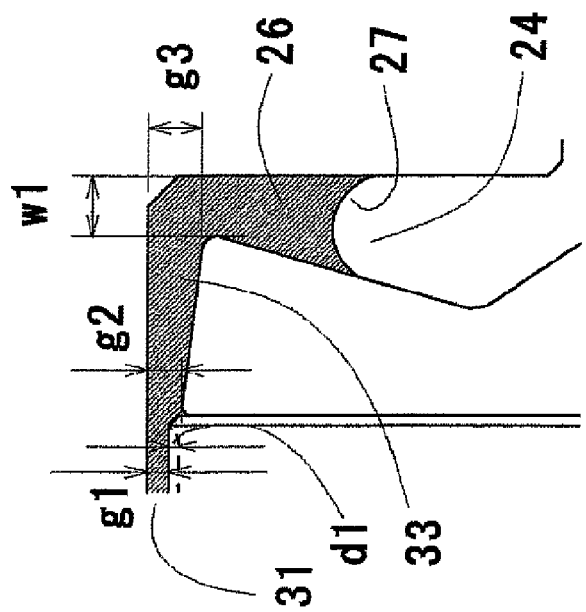

FIGS. 7A and 7B illustrate another embodiment 1 of the fluid dynamic-pressure bearing device including a thrust plate 35 provided at the shaft tip end. This fluid dynamic-pressure bearing device 2b includes two thrust dynamic-pressure bearings 19 and 20 which generate opposite supporting forces. The annular gap 33 is placed outside of the upper thrust dynamic-pressure bearing 19 and communicates the sealing gap 24 with the bearing gap.

The thrust dynamic-pressure bearings 19 and 20 are both configured to gradually increase the pressure of the lubricating liquid towards the radial bearings. The pair of the dynamic-pressure bearings are placed at the upper and lower portions such that they generate opposite supporting forces. These thrust dynamic-pressure bearings generate dynamic pressures thus generating supporting forces in the thrust direction and also increase the pressure within the radial narrow gap 30. The lubricating liquid comes into contact with atmosphere within the sealing gap portion and thus the concentration of air dissolved therein is the concentration which can keep equilibrium at the atmospheric pressure. Therefore, at the radial narrow gap portion, air is dissolved therein at a concentration lower than the concentration which keeps equilibrium at the pressure, which suppresses the occurrence of air bubbles within the radial narrow gap. The upper and lower thrust dynamic-pressure bearings 19 and 20 are identical and thus do not offer the effect of actively circulating the lubricating liquid.

Further, the thrust dynamic-pressure generating grooves constituting the thrust dynamic-pressure bearings are not limited to spirally-shaped dynamic-pressure grooves as illustrated in FIG. 2B. They may be so-called herringbone shaped dynamic-pressure generating grooves. The thrust supporting forces can be enhanced. However, in this case, the thrust dynamic-pressure generating grooves have unbalanced herringbone shape such that the inward pressure rise is greater within the entire thrust dynamic-pressure bearing.

The pair of radial dynamic-pressure bearings 17 and 18b are configured to increase the pressure of the lubricating liquid from the upper and lower ends of the respective bearings toward their centers. By providing herringbone shaped dynamic-pressure generating grooves, for example, these dynamic-pressure bearings can be configured.

The radial dynamic-pressure bearing 17 placed at the upper portion, out of these radial dynamic-pressure bearings, acts on the lubricating liquid in a symmetric manner upwardly and downwardly and does not offer the effect of actively circulating the lubricating liquid. The radial dynamic-pressure bearing 18b placed at the lower portion of the bearing is configured such that the effect of upwardly raising the lubricating-liquid pressure is greater. Consequently, the radial dynamic-pressure bearings 17 and 18b and the thrust dynamic-pressure bearings 19 and 20 act, in totality, to circulate the lubricating liquid in a single direction. The lubricating liquid proceeds in the lower-to-upper direction through the radial narrow gap 30, reaches the thrust narrow gap 31, passes through the communicating path 12 and then reaches the lower thrust narrow gap 32.

Although a small number of air bubbles are generated even when the pressures within the radial narrow gaps are increased, such air bubbles are discharged through the circulation of the lubricating liquid. Air bubbles contained in the lubricating liquid discharged from the radial narrow gap 30 are pushed towards the thrust narrow gap. Air bubbles which have reached the thrust narrow gap are discharged towards the annular gap 33 through the effect of the thrust dynamic-pressure bearing. At this time, the lubricating liquid returns to the communicating path 12 while air bubbles are pushed outwardly through the annular gap and are discharged to the sealing gap due to the differences of shear flow velocities. Further, the circulation of lubricating liquid facilitates discharge of abrasion dusts resulted from contacts of the bearing surfaces or the like.

FIG. 7B illustrates an enlarged view of the portion encircled by the dotted line in FIG. 7A. Similarly to the second embodiment illustrated in FIGS. 6A and 6B, the flange surface is outwardly inclined. In this example, the values of g1, g2, g3, w1 and d1 are substantially the same as those of the Page 16 of 40 second embodiment. Further, the radius r2 of the flange-surface inner periphery is also the same, but the radius r3 of the outer periphery is 3.25 mm. Since r3 is smaller than that of the second embodiment, the difference between the value of r2/g2 and the value of r3/g3 is further increased.

In the present embodiment, the thrust plate 35 acts as a pull-out preventing member for the shaft. This eliminates the necessity of forming a pull-out preventing member at the back side of the flange surface, thus enabling reduction of the outer dimension of the flange surface. Obviously, in the present embodiment, the diameter of the flange surface may be arbitrarily increased in order to further enhance the oil-buffer function thereof.

FOURTH EMBODIMENT

FIGS. 8A and 8B illustrate a fluid dynamic-pressure bearing device according to a modified embodiment of the embodiment 1 illustrated in FIGS. 7A and 7B. The sleeve and the housing are not separated and are constituted by a single member 10b. The communicating path 12 is constituted by an axial through hole formed by perforating the integral sleeve 10b. The thrust bearing surface 15 and the flange surface 16b of the fixed portion are both constituted by an end surface of the sleeve 10b. In this embodiment, thrust dynamic-pressure generating grooves 19 are formed on the thrust bearing surface 15, while the flange surface is not provided with groove configurations such as stirring-up grooves.

On the other hand, the thrust bearing surface 13 and the annular surface 14b of the hub are not on the same plane. The annular surface 14b is upwardly inclined and therefore the dimension of the annular gap 33 is gradually outwardly increased. In the present embodiment, the values of g1, g2, g3, w1 and d1 are the same as those of the third embodiment.

Further, the radial dynamic-pressure bearing 17b placed at the upper portion, out of the radial dynamic-pressure bearings, is configured to downwardly increase the pressure of the lubricating liquid. Thus, the lubricating liquid circulates within the fluid dynamic-pressure bearing device along such a path that it proceeds downwardly through the radial bearing gap, passes through the communicating path 12 and returns to the annular gap 33. The direction of circulation is opposite to that of the dynamic-pressure bearing device of FIGS. 7A and 7B, but the device is similar thereto at the point that it offers the effect of discharging air bubbles and abrasion dusts.

With the fluid dynamic bearing device according to this embodiment, there is no need for preparing a separate housing, thus enabling reducing the number of components of the bearing.

FIFTH EMBODIMENT

Figures 9A, 9B:
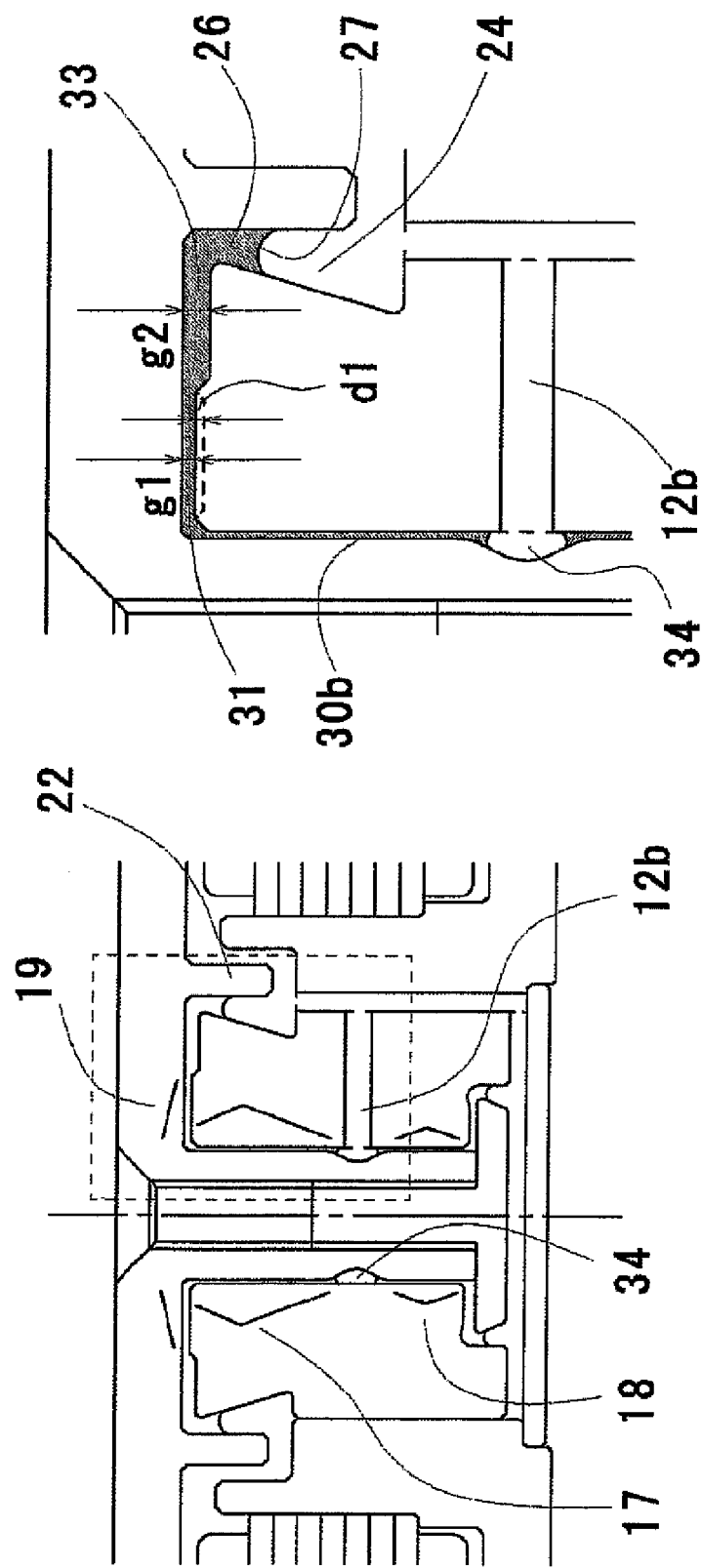
FIGS. 9A and 9B illustrate another embodiment 2 of the fluid dynamic-pressure bearing device according to the embodiment of the present invention.

FIGS. 9A and 9B illustrate a further embodiment 2 which belongs to the present invention. The lubricating liquid filled in the bearing gap is partitioned by an annular air gap 34 between the two radial dynamic bearings. The upper part of the partitioned lubricating liquid fills the radial narrow gap 30b, the thrust narrow gap 31 and the annular gap 33 in a continuous manner. The annular air gap 34 and the sleeve side surface are communicated with each other through a communicating path 12b, but the communicating path 12b is not filled with the lubricating liquid. Lubricating liquid can be injected into the bearing through the communicating path 12b when the bearing is fabricated.

The dimension g1 of the thrust narrow gap, the dimension g2 of the annular narrow gap and the depth d1 of the thrust dynamic-pressure generating grooves are set to the same values as those of the second embodiment and the condition according to the present invention is satisfied.

In this dynamic-pressure bearing device, similarly to in the bearing devices according to the other embodiments which have been described, the thrust dynamic-pressure bearing is biased inwardly, thus generating a small peripheral speed and a small bearing loss. Further, as well as the sealing gap 24, the annular gap also functions as an oil buffer, thus suppressing the occurrence of depletion of the lubricating liquid.

SIXTH EMBODIMENT

Figure 10:
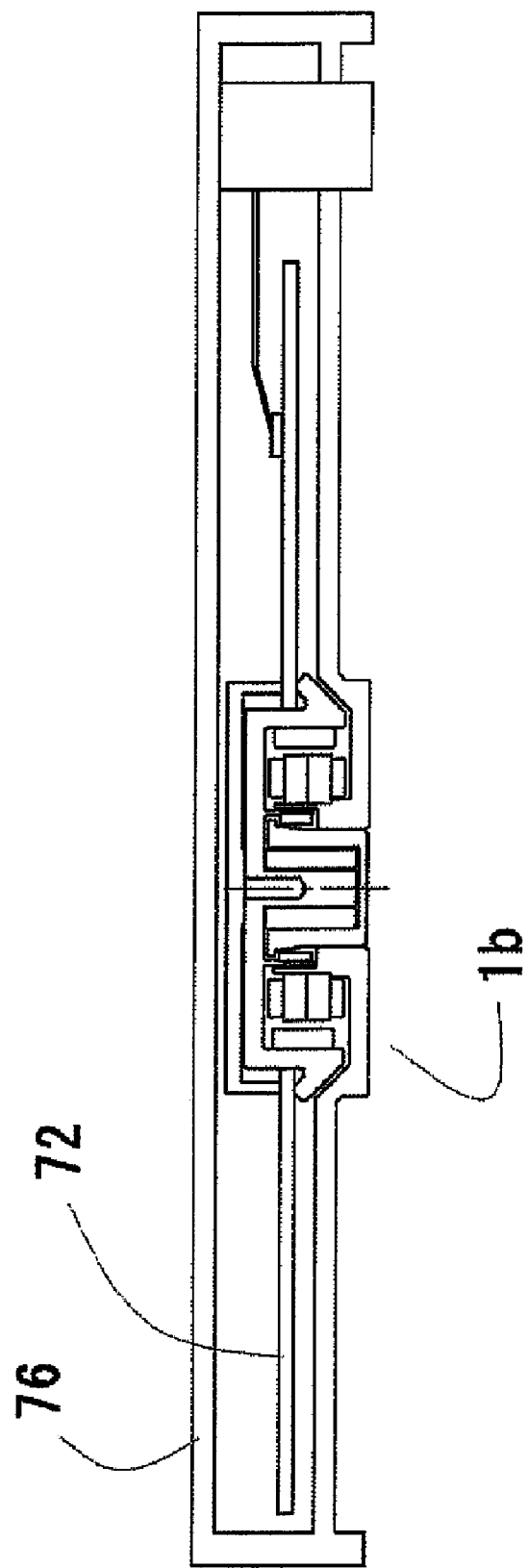
FIG. 10 illustrates a hard disk drive according to an embodiment of the present invention.
Figure 11:
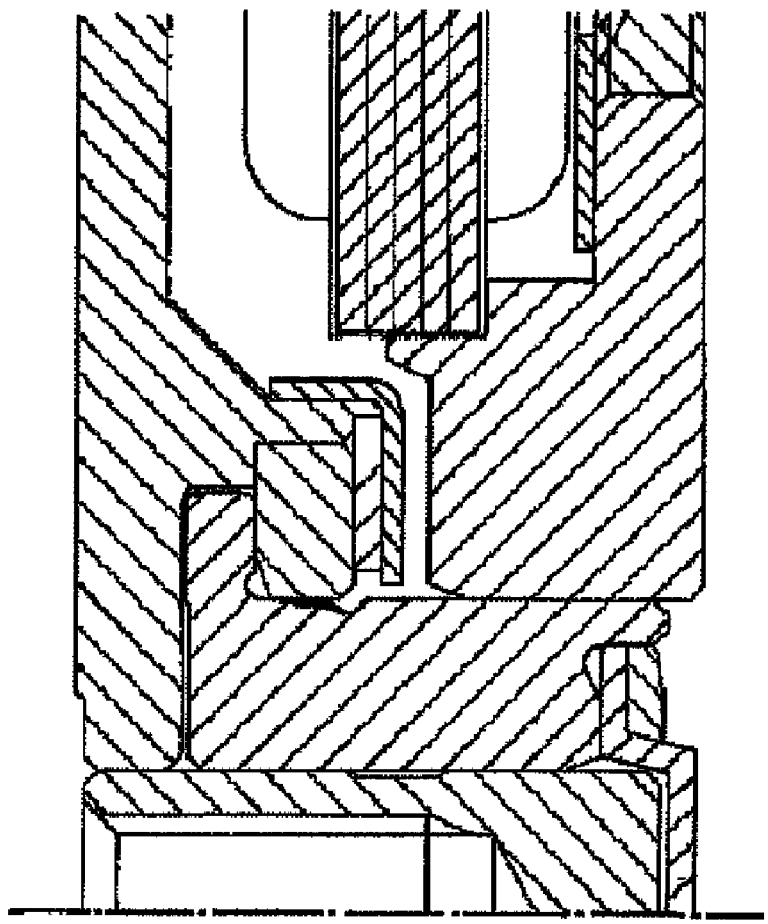
FIG. 11 illustrates a conventional dynamic-pressure bearing device.
Figure 12:
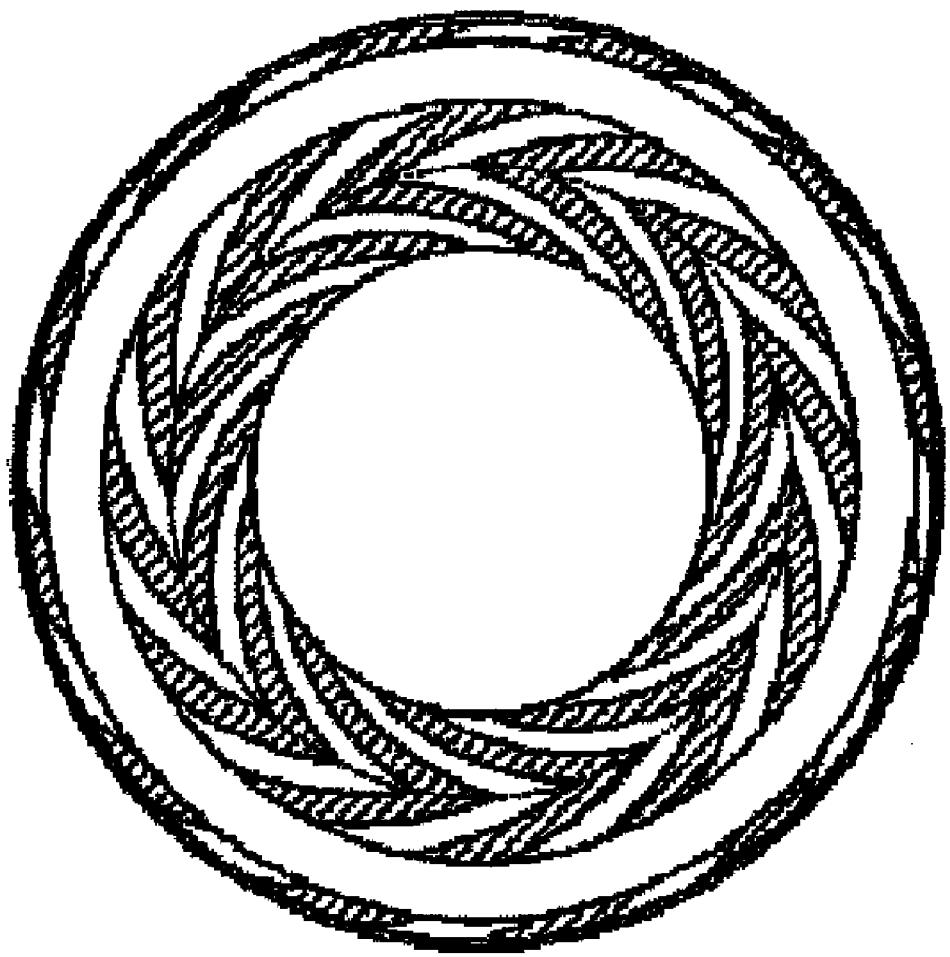
FIG. 12 illustrates another example of a conventional dynamic-pressure bearing device.
Figure 13:
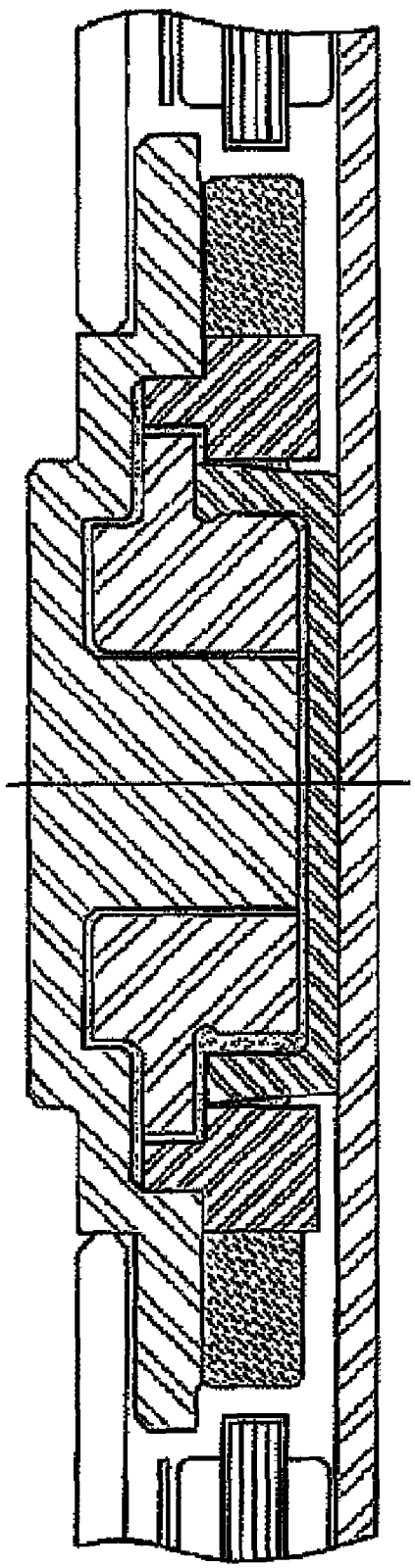
FIG. 13 illustrates a further example of a conventional dynamic-pressure bearing device.

FIG. 10 is a schematic view of a 1-inch hard-disk drive which belongs to the present invention. It incorporates a spindle motor 1b according to the present invention for rotating and driving a magnetic disk 72.

In the fluid dynamic-pressure bearing devices according to the present invention, the thrust dynamic-pressure bearing is formed at a relatively inner position and thus the supporting force thereof in the thrust direction is not necessarily large. However, in the case where such a small magnetic disk is driven, the weight of the rotor portion is small, thus not requiring a large thrust supporting force. The configuration according to the present invention which enables reduction of the bearing loss can offer the advantage of reduction of the electric power consumption. Since ultrasmall hard disks such as 1-inch hard disks are utilized for mobile applications in many cases, the reduction of the electric power consumption of the spindle motor offers a large advantage.

Further, for the fluid dynamic-pressure bearing devices configured such that the sleeve is inserted into the housing, out of the fluid dynamic-pressure bearing devices which have been described in the aforementioned first to sixth embodiments, the sleeve may be formed from a porous material such as sintered metal. In comparison with the case of forming the sleeve from a normal metal material, this can reduce the cost and also suppresses the occurrence of troubles due to abrasion dusts since the porous portion captures fine abrasion dusts.

What is claimed is:

1. A fluid dynamic-pressure bearing device comprising:
a shaft rotatable about a central axis, whereby the device has an axial direction corresponding to the direction of the central axis, and a radial direction perpendicular to the central axis;
a hub having a hub-thrust bearing surface which extends from an outer peripheral surface of the shaft outwardly in the radial direction, and a hub annular surface which extends outwardly from the hub-thrust bearing surface;
a fixed portion into which the shaft extends,
the fixed portion having an inner peripheral surface facing and spaced from the outer peripheral surface of the shaft in the radial direction such that a radial gap having first and second ends, opposite one another in the axial direction, exists between the inner and outer peripheral surfaces,
a fixed-portion upper thrust bearing surface facing and spaced from the hub-thrust bearing surface in the axial direction such that an upper thrust gap exists between the fixed-portion upper thrust and hub-thrust bearing surfaces, the upper thrust gap open to the radial gap at the first end of the radial gap, and
a flange surface facing and spaced from the hub annular surface in the axial direction such that an annular gap exists between the flange and hub annular surfaces, and
the fixed portion delimiting a communicating path open to and extending between the upper thrust gap and the second end of the radial gap, whereby a passageway in the form of a loop is formed within the device by the radial gap, the communicating path, and the thrust gap; and
a contiguous body of lubricating liquid occupying the radial gap, the upper thrust gap, the communicating path, and the annular gap, and wherein
at least one of the outer peripheral surface of the shaft and the inner peripheral surface of the fixed portion has radial dynamic-pressure generating grooves extending therein, the radial dynamic-pressure generating grooves being configured to generate pressure, acting in the radial direction, in the lubricating liquid in the radial gap during rotation of the shaft, whereby the lubricating liquid occupying the radial gap and the radial dynamic-pressure generating grooves constitute a radial dynamic-pressure bearing which supports the shaft for rotation about the central axis,
at least one of the hub-thrust bearing surface and the fixed-portion upper thrust bearing surface has upper thrust dynamic-pressure generating grooves therein, the thrust dynamic-pressure generating grooves being configured to generate dynamic pressure, acting in the axial direction, in the lubricating fluid in the upper thrust gap during rotation of the shaft, whereby the lubricating liquid occupying the upper thrust gap and the thrust dynamic-pressure generating grooves constitute a thrust dynamic-pressure bearing which supports the hub in the axial direction during rotation of the shaft,
the dynamic-pressure bearings are configured to generate a net pressure, acting in one direction of the loop formed by the passageway, in the lubricating liquid during rotation of the shaft, whereby the dynamic-pressure bearings circulate the lubricating liquid along the passageway during the rotation of the shaft, and
an axial dimension of the annular gap is larger than the sum of an axial dimension of the upper thrust gap and the average depth of the upper thrust dynamic-pressure generating grooves, the axial dimension of the annular gap being a width of the annular gap between the hub annular surface and the flange surface as measured in the axial direction, and the axial dimension of the upper thrust gap being a width of the upper thrust gap between the hub-thrust bearing surface and the fixed-portion upper thrust bearing surface as measured in the axial direction.

2. The fluid dynamic-pressure bearing according to claim 1, further comprising:
a thrust plate disposed below the shaft and extending from the outer peripheral surface of the shaft outwardly in the radial direction and wherein
the fixed portion has a fixed-portion lower thrust bearing surface facing and spaced from an upper surface of the thrust plate in the axial direction such that a lower thrust gap exists between the fixed-portion lower thrust bearing surface and the upper surface of the thrust plate, and
the contiguous body of lubricating liquid also occupies the lower thrust gap, and
at least one of the upper surface of the thrust plate and the fixed-portion lower thrust bearing surface has lower thrust dynamic-pressure generating grooves therein, the lower thrust dynamic-pressure generating grooves being configured to generate dynamic pressure, acting in the axial direction, in the lubricating fluid in the lower thrust gap during rotation of the shaft, whereby the lubricating liquid occupying the low thrust gap and the lower thrust dynamic-pressure generating grooves constitute a lower thrust dynamic-pressure bearing which supports the shaft in the axial direction during rotation of the shaft.

3. The fluid dynamic-pressure bearing according to claim 1, wherein the fixed portion includes:
a housing having the flange surface; and
a sleeve disposed inside the housing and having the inner peripheral surface and the fixed-portion upper thrust bearing surface, and
the communicating path extends between an outer peripheral surface of the sleeve and an inner peripheral surface of the housing.

4. The fluid dynamic-pressure bearing according to claim 1, wherein the flange surface is offset, in the axial direction away from the hub, relative to the fixed-portion upper thrust bearing surface.

5. The fluid dynamic-pressure bearing according to claim 1, wherein the width of the annular gap increases in the radial direction away from the upper thrust bearing gap.

6. The fluid dynamic-pressure bearing according to claim 5, wherein the flange surface is inclined relative to the central axis away from the hub annular surface in the radial direction away from the upper thrust gap.

7. The fluid dynamic-pressure bearing according to claim 1, wherein
the hub includes a cylindrical wall extending axially from the outer periphery of the annular surface and encircling the fixed portion,
an inner peripheral surface of the cylindrical wall of the hub and an outer peripheral surface of the fixed portion face and are spaced apart from each other in the radial direction such that a seal gap exist between the inner peripheral surface of the cylindrical wall and the outer peripheral surface of the fixed portion, a radial dimension of the seal gap increases in the axial direction away from the annular surface of the hub, the radial dimension of the seal gap being the width of the seal gap between the inner peripheral surface of the cylindrical wall and the outer peripheral surface of the fixed portion as measured in the radial direction, and the contiguous body of lubricating liquid also occupies the seal gap, the lubricating liquid having a free surface that spans the inner peripheral surface of the cylindrical wall and the outer peripheral surface of the fixed portion such that an interface between the lubricating liquid and air being exists in the seal gap.

8. The fluid dynamic-pressure bearing according to claim 7, wherein there is only one interface between the lubricating liquid and air.

9. The fluid dynamic-pressure bearing according to claim 1, wherein the hub includes a cylindrical wall extending axially from the outer the outer periphery of the annular surface and encircling the fixed portion, and the fixed portion includes a flange having the flange surface, and further comprising an annular member secured to an inner peripheral surface of the cylindrical wall, the annular member having an upper end surface facing a lower surface of the flange in the axial direction, and an inner peripheral surface located radially inwardly of an outer peripheral surface of the flange, whereby the upper end surface of the annular member is capable of coming into contact with the lower surface of the flange during rotation of the shaft, to prevent removal of the hub from the fixed portion.

10. The fluid dynamic-pressure bearing according to claim 9, wherein an inner peripheral surface of the annular member and an outer peripheral surface of the fixed portion face and are spaced apart from each other in the radial direction such that a seal gap exist between the inner peripheral surface of the annular member and the outer peripheral surface of the fixed portion, a radial dimension of the seal gap increases in the axial direction away from the annular surface of the hub, the radial dimension of the seal gap being the width of the seal gap between the inner peripheral surface of the cylindrical wall and the outer peripheral surface of the fixed portion as measured in the radial direction, and the contiguous body of lubricating fluid also occupies the seal gap, the lubricating liquid having a free surface that spans the inner peripheral surface of the cylindrical wall and the outer peripheral surface of the fixed portion such that an interface between the lubricating liquid and air exists in the seal gap.

11. The fluid dynamic-pressure bearing according to claim 1, wherein at least one of the flange surface and the annular surface of the hub has stirring-up grooves therein configured to urge the lubricating liquid, which occupies the annular gap, radially inward during rotation of the shaft.

12. The fluid dynamic-pressure bearing according to claim 1, wherein the fixed portion includes:

an approximately cup-shaped housing having the flange surface; and a sleeve disposed inside the housing and having the inner peripheral surface and the fixed-portion upper thrust bearing surface.

13. The fluid dynamic-pressure bearing according to claim 12, wherein the sleeve is of porous sintered metal impregnated with the lubricating liquid.

14. The fluid dynamic-pressure bearing according to claim 1, wherein upper and lower portions of the at least one of the outer peripheral surface of the shaft and the inner peripheral surface of the fixed portion have upper and lower sets of the radial dynamic-pressure generating grooves therein, respectively, each of the upper and lower sets of the radial dynamic-pressure generating grooves being configured to generate dynamic pressure, acting in the radial direction, in the lubricating liquid in the radial gap during rotation of the shaft, whereby the lubricating liquid occupying the radial gap and the upper and lower sets of radial dynamic-pressure generating grooves constitute upper and lower radial dynamic-pressure bearings, adjacent the first and second ends of the radial gap, respectively, which support the shaft for rotation about the central axis, and the upper set of dynamic-pressure generating grooves are configured to generate pressure, acting in the axial direction from the first end of the axial gap towards the second end of the axial gap, in the lubricating liquid during rotation of the shaft.

15. A motor comprising:

the fluid dynamic-pressure bearing according to claim 1;

a rotor magnet fixed to the hub; and a stator integral with the fixed portion and facing the rotor magnet.

16. A disk drive comprising:

a housing: and a motor mounted to the housing, wherein the motor comprises:

the fluid dynamic-pressure bearing according to claim 1, wherein the hub has a disk-supporting portion configured to support a magnetic data storage disk such that the disk will be rotated during rotation of the shaft;

a rotor magnet fixed to the hub; and a stator integral with the fixed portion and facing the rotor magnet.

17. A fluid dynamic-pressure bearing device comprising:

a rotary unit rotatable about a central axis, whereby the device has an axial direction corresponding to the direction of the central axis, and a radial direction perpendicular to the central axis;

a stationary unit to which the rotary unit is mounted; and a contiguous body of lubricating liquid interposed between the rotary and stationary units, wherein the rotary and stationary units have a cylindrical outer peripheral surface, and a cylindrical inner peripheral surface facing and spaced from the cylindrical outer peripheral surface in the radial direction such that a radial gap having first and second ends, opposite one another in the axial direction, exists between the inner and outer peripheral surfaces, a first thrust bearing surface which extends in the radial direction of the device substantially perpendicular to the axial direction, and an annular surface which extends outwardly from the first thrust bearing surface, a second thrust bearing surface facing and spaced from the first thrust bearing surface in the axial direction such that a thrust gap exists between the first and second thrust bearing surfaces, the thrust gap open to the radial gap at the first end of the radial gap, a flange surface facing and spaced from the annular surface in the axial direction such that an annular gap exists between the flange and hub annular surfaces, and a communicating path open to and extending between the thrust gap and the second end of the radial gap, whereby a passageway in the form of a loop is formed within the device by the radial gap, the communicating path, and the thrust gap;

wherein the contiguous body of lubricating liquid occupies the radial gap, the upper thrust gap, the communicating path, and the annular gap; and wherein at least one of the cylindrical outer peripheral surface and the cylindrical inner peripheral surface of the rotary and stationary units has radial dynamic-pressure generating grooves extending therein, the radial dynamic-pressure generating grooves being configured to generate pressure, acting in the radial direction, in the lubricating liquid in the radial gap during rotation of the rotary unit, whereby the lubricating liquid occupying the radial gap and the radial dynamic-pressure generating grooves constitute a radial dynamic-pressure bearing, at least one of the first and second thrust bearing surfaces has upper thrust dynamic-pressure generating grooves therein, the thrust dynamic-pressure generating grooves being configured to generate dynamic pressure, acting in the axial direction, in the lubricating fluid in the upper thrust gap during rotation of the rotary unit, whereby the lubricating liquid occupying the thrust gap and the thrust dynamic-pressure generating grooves constitute a thrust dynamic-pressure bearing which supports the rotary unit in the axial direction during rotation of the rotary unit;

wherein the dynamic-pressure bearings are configured to generate a net pressure, acting in one direction of the loop formed by the passageway, in the lubricating liquid during rotation of the rotary unit, whereby the dynamic-pressure bearings circulate the lubricating liquid along the passageway during the rotation of the rotary unit; and wherein an axial dimension of the annular gap is larger than the sum of an axial dimension of the thrust gap and the average depth of the thrust dynamic-pressure generating grooves, the axial dimension of the annular gap being a width of the annular gap between the annular surface and the flange surface as measured in the axial direction, and the axial dimension of the thrust gap being a width of the thrust gap between the first and second thrust bearing surfaces as measured in the axial direction.

18. The fluid dynamic-pressure bearing according to claim 17, wherein upper and lower portions of the at least one of the outer peripheral surface and inner peripheral surface of the stationary and rotary units have upper and lower sets of the radial dynamic-pressure generating grooves therein, respectively, each of the upper and lower sets of the radial dynamic-pressure generating grooves being configured to generate dynamic pressure, acting in the radial direction, in the lubricating liquid in the radial gap during rotation of the rotary unit, whereby the lubricating liquid occupying the radial gap and the upper and lower sets of radial dynamic-pressure generating grooves constitute first and second radial dynamic-pressure bearings, adjacent the first and second ends of the radial gap, respectively, which support the rotary unit for rotation about the central axis, and the first set of dynamic-pressure generating grooves are configured to generate pressure, acting in the axial direction from the first end of the axial gap towards the second end of the axial gap, in the lubricating liquid during rotation of the rotary unit.

19. The fluid dynamic-pressure bearing according to claim 18, wherein the first set of dynamic-pressure generating grooves are asymmetrical with respect to a plane which extends perpendicular to the central axis and bisects, in the axial direction, the upper set of dynamic-pressure generating grooves.

20. The fluid dynamic-pressure bearing according to claim 19, wherein the stationary and rotary units also have a inner peripheral seal surface and an outer seal peripheral surface that face and are spaced apart from each other in the radial direction such that a seal gap exists therebetween, the seal gap is open to the passageway at an end of the thrust gap, a radial dimension of the seal gap increases in the axial direction away from the annular surface, the radial dimension of the seal gap being the width of the seal gap between the inner peripheral seal surface and the outer peripheral seal surface in the radial direction, and the contiguous body of lubricating fluid also occupies the seal gap, the lubricating liquid having a free surface that spans the inner peripheral seal surface and the outer peripheral seal surface such that an interface between the lubricating liquid and air exists in the seal gap.

\* \* \* \* \*